June 24, 1930.  L. H. KAUPKE  1,767,851
CULTIVATOR
Filed Aug. 1, 1924  6 Sheets-Sheet 3
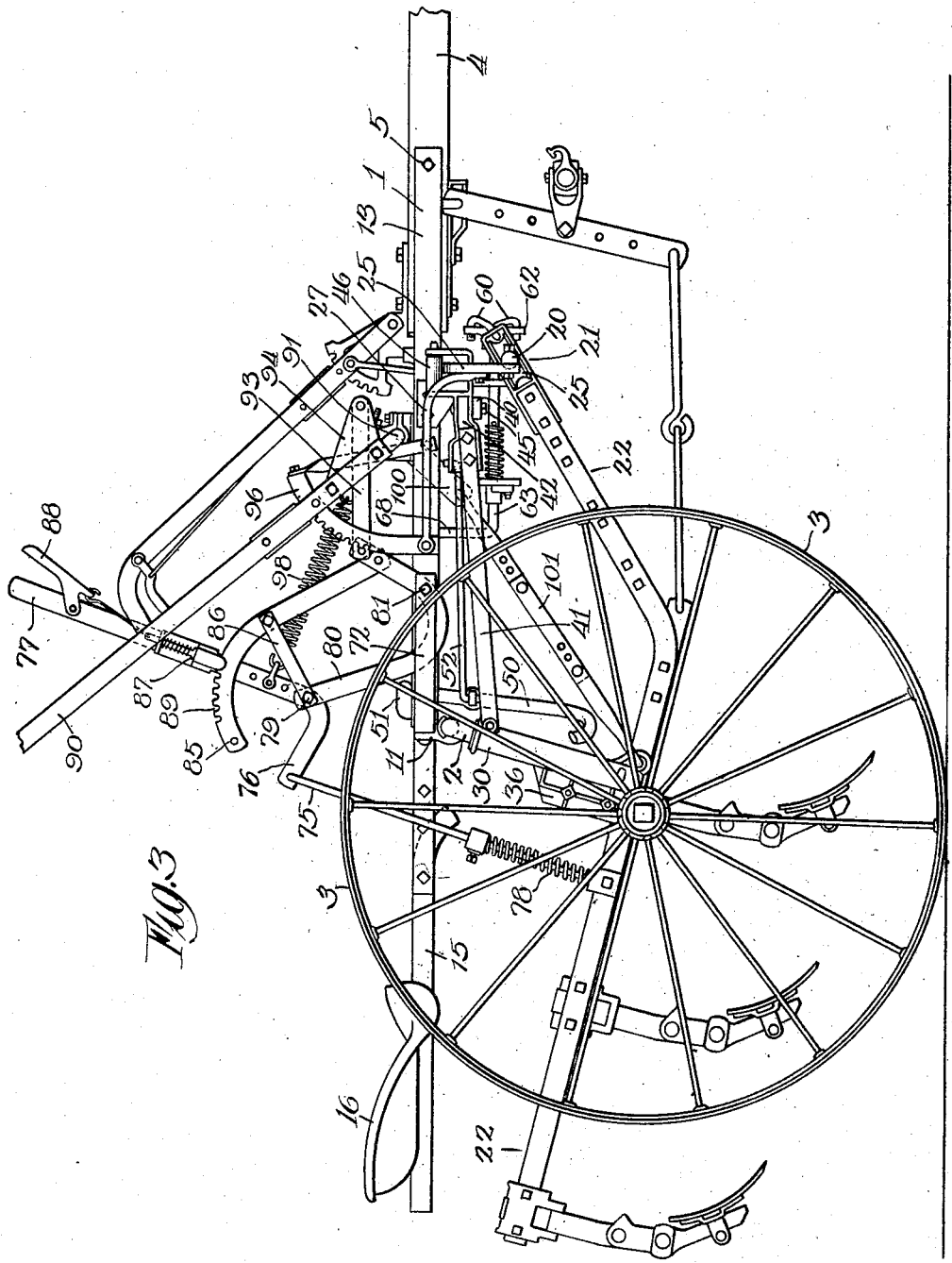
Inventor:
Lee H. Kaupke
By Offield Nehlhope Scott & Poole Attys.

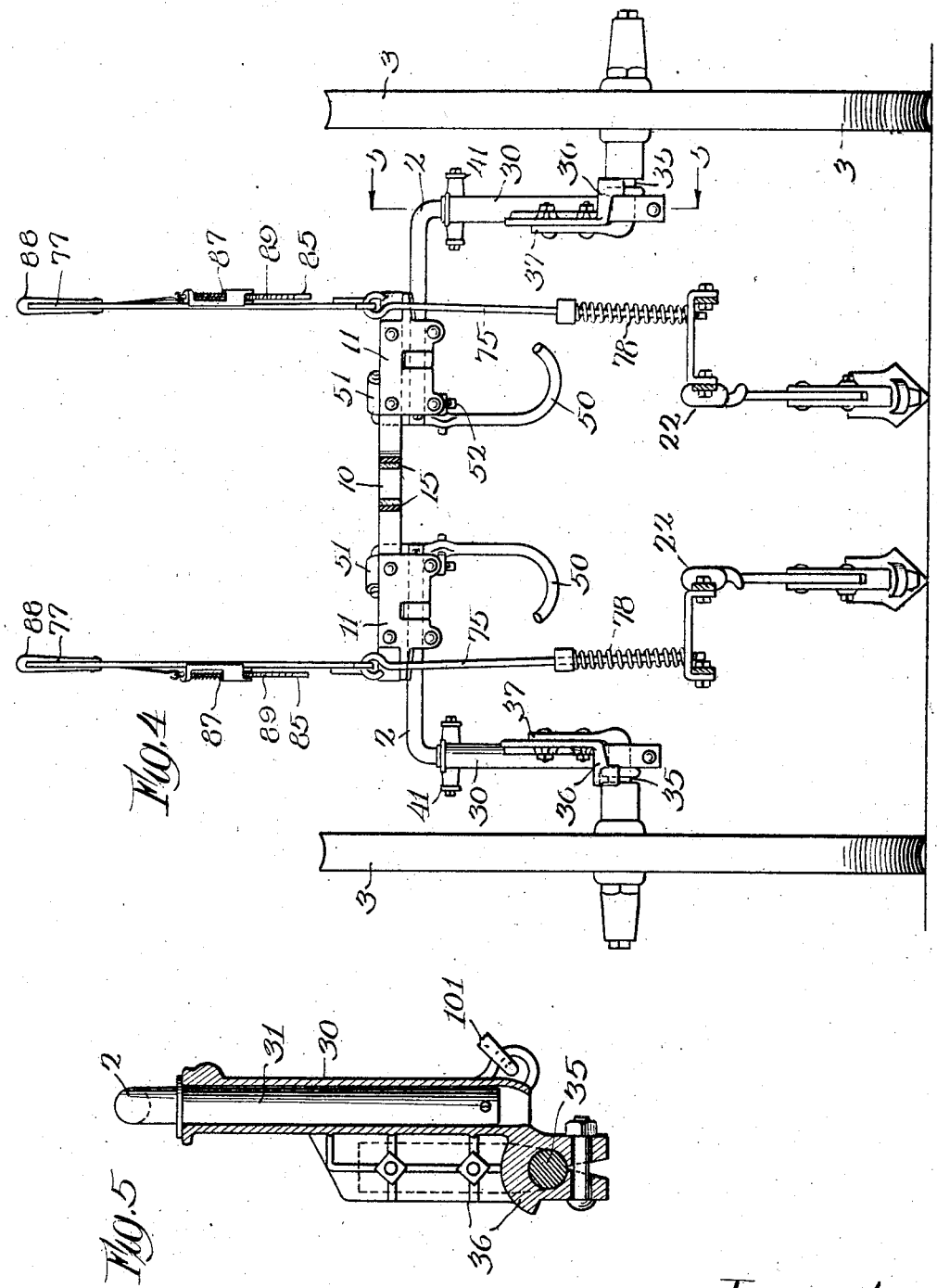

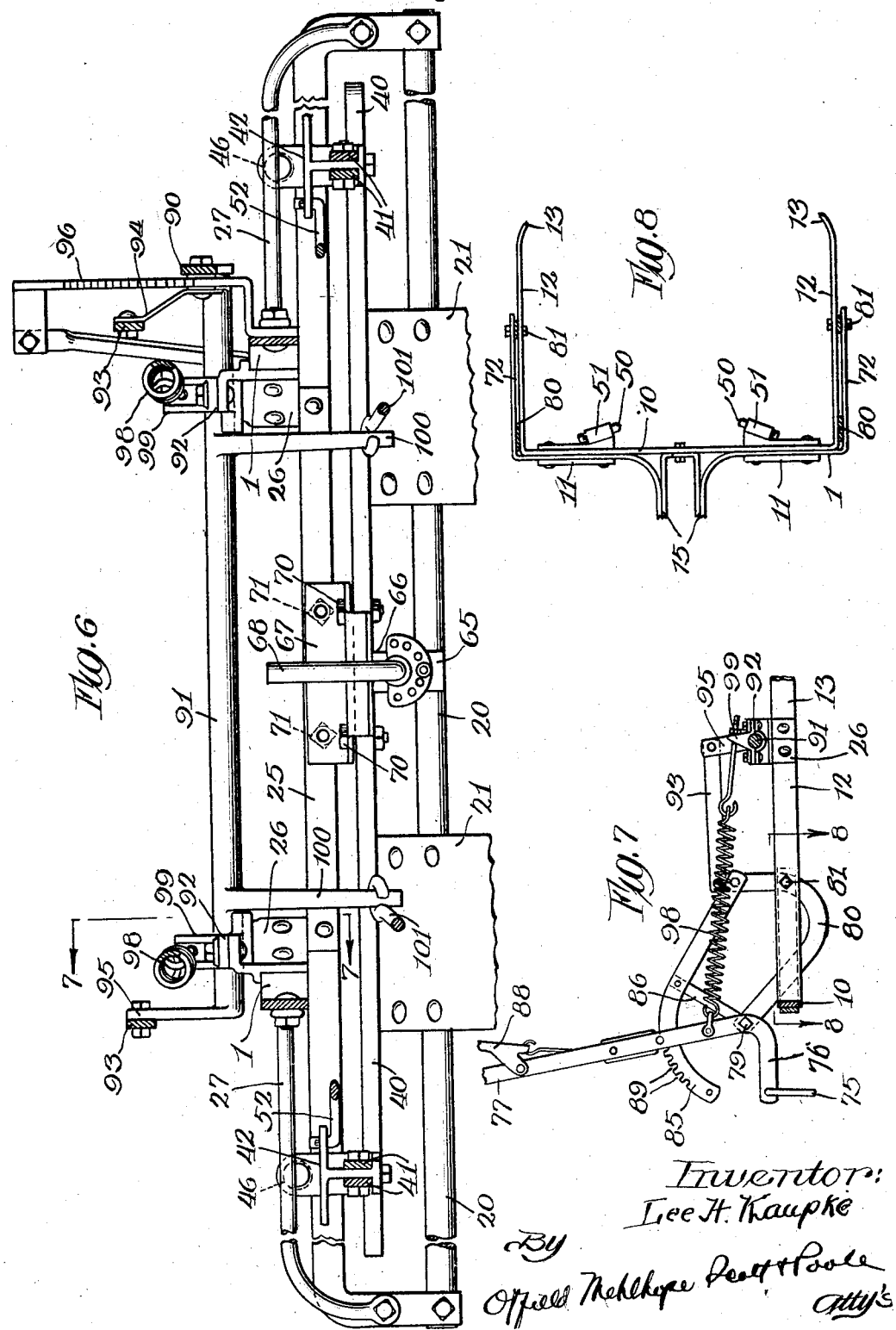

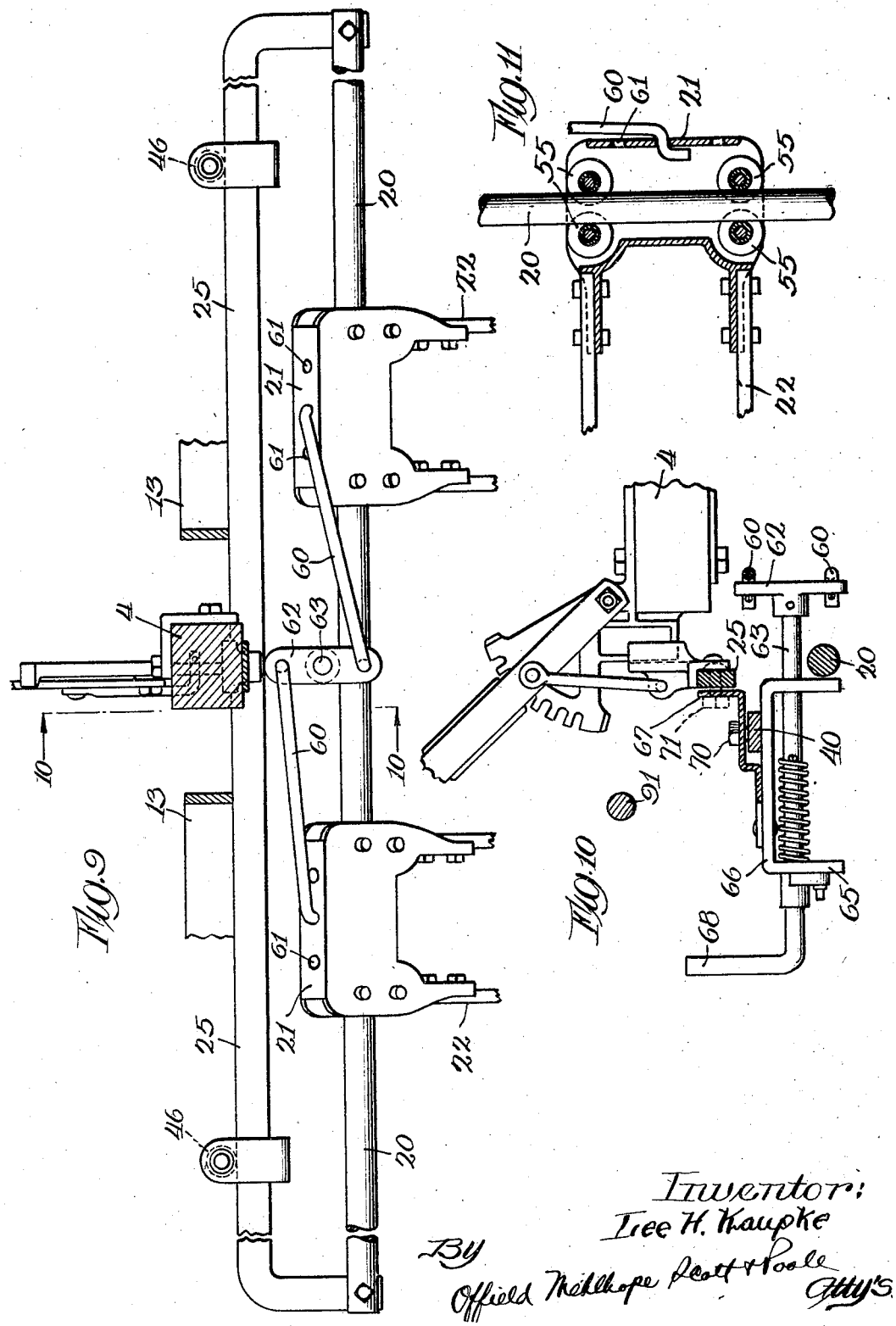

Patented June 24, 1930

1,767,851

UNITED STATES PATENT OFFICE

LEE H. KAUPKE, OF ROCK ISLAND, ILLINOIS, ASSIGNOR TO ROCK ISLAND PLOW COMPANY, OF ROCK ISLAND, ILLINOIS, A CORPORATION OF ILLINOIS

CULTIVATOR

Application filed August 1, 1924. Serial No. 729,509.

This invention relates to cultivators.

The principal object of my invention is to provide improved and new construction of a device of the character described.

Among the principal features of the invention are the provisions of means for shifting the cultivator gangs laterally at their forward ends simultaneously with the steering movement of the supporting wheels on their vertical axis for line of draft, and means for balancing the cultivator when the gangs are raised from the ground. Other features of invention will appear from time to time as the description proceeds.

The invention may be best understood by reference to the accompanying drawings in which:

Figure 3 is a view similar to Figure 2, but showing the cultivator gangs in raised position.

Figure 4 is a view in cross section, taken on line 4, 4 of Figure 1, with parts omitted.

Figure 5 is an enlarged sectional view taken on line 5, 5 of Figure 4.

Figure 6 is an enlarged sectional view taken on line 6, 6 of Figure 1 with parts broken away.

Figure 7 is a detailed view of the lever mechanism for raising and lowering the cultivator gangs showing its mounting on the main frame.

Figure 8 is a detailed view of the main frame showing the method of mounting the levers shown in Figure 7.

Figure 9 is an enlarged sectional view taken on line 9, 9 of Figure 2.

Figure 10 is a sectional view taken on line 10, 10 of Figure 9.

Figure 11 is a detailed cross section of one of the cultivator beam heads.

Figure 1:
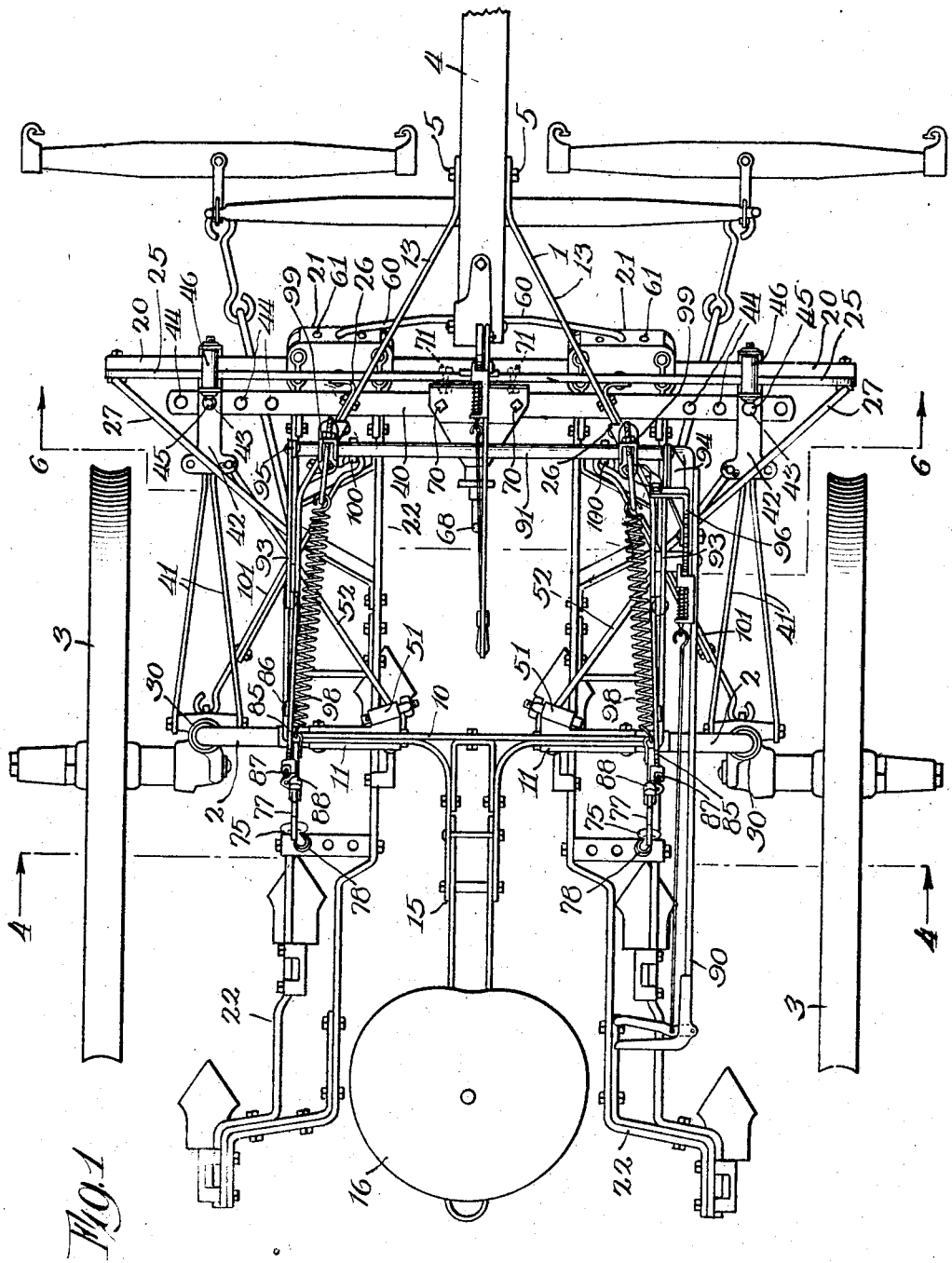
Figure 1 is a top plan view of a cultivator constructed in accordance with my invention.

Referring now to details of construction shown in the drawings, my improved cultivator disclosed therein comprises a main frame 1 having a pair of bail axles 2, 2 with supporting wheels 3, 3 thereon and tongue 4 connected to the forward end of said frame. In the form shown the main frame comprises a continuously formed frame member having a transverse extending portion 10, to which the bail axles are secured by means of brackets 11, 11 and forwardly extending parallel portions 12, 12 which are again bent at the forward portion of the frame to form converging portions 13, 13 to which the pivoted tongue 4 is pivotally secured at 5. A seat frame 15 carrying the seat 16 of the usual construction is secured to the transverse portion 10 to provide support for the driver in the usual position at the rear of the structure. Rigidly attached at the forward end of the frame is a transverse supporting or draft bar 20 upon which is carried gang heads 21, 21 of cultivator beams 22, 22. This supporting or draft bar is connected at opposite ends to a yoke 25, also extending transversely of the frame and arranged parallel above said supporting bar. This yoke is rigidly connected to the frame by a pair of brackets 26, 26 secured to the main frame members 13, 13 and in addition to a pair of diagonally disposed struts 27, 27 connected to the outer ends of said yoke and extending inwardly and rearwardly to the adjacent main frame portions 12, 12. The supporting wheels are arranged so that they may be swung pivotally on a vertical axis in order that the device may be steered. This pivotal action is afforded through the construction of the bail axles which are provided with a pair of vertical disposed swivel brackets 30, 30 rotatably mounted on downwardly extending rods 31, 31 extending outwardly and downwardly from the main frame. Said rods also have pivotal bearing in the brackets 11, 11 on a transverse axis for a purpose that will hereinafter appear. The supporting wheels 3, 3 are each journalled on a stub axle 35 connected to an offset portion 36 extending rearwardly from a swivel bracket 30. The inner end of said stub axle is preferably bent upwardly and provided with a flattened end portion 37 secured to the said offset portion 36 as clearly shown in Figures 4 and 5.

Connecting means are provided whereby the wheels are swiveled in unison while steering. This means comprises a cross bar 40 located to the rear of the yoke 25 and substantially parallel therewith, said cross bar having each end thereof connected to the upper end of the adjacent swiveling bracket 30 by a connecting arm, herein consisting of a pair of links 41, 41 pivoted on a transverse axis to said bracket to permit vertical movement. As shown herein the forward ends of each of the links 41, 41 are rigidly connected to an end bracket 42 having adjustable connection along the adjacent end of the cross bar 40, adjustment being afforded by means of a boss or swivel 43 in said bracket, adapted to register with a series of holes 44, 44 in the cross arm and secured thereto by a removable pin 45. The cross bar 40 is supported so as to permit transverse movement thereof respective to the frame by means of a pair of rollers 46, 46 herein shown as carried at the forward end of the brackets 42, 42, said rollers bearing upon the upper surface of the yoke 25 rigidly attached to the frame as aforesaid.

Means are provided for steering the wheels which means herein shown comprises a pair of swinging foot levers 50, 50 mounted at an oblique angle to each other on brackets 51, 51 secured to the main frame and each connected to its adjacent end of the transverse moving cross bar 40 by means of a link or rod 52 pivotally connected to the end bracket 42 on said bar. The foot levers are in position to be readily operated by a driver who may control the lateral position of the transverse movable cross bar and by reason of the parallel arrangement of said bar and the links 41, 41 connected to the swivel axle brackets, the supporting wheels may be maintained in substantial parallel relation in all permissible positions thereof.

The cultivator gang heads 21, 21 are arranged for longitudinal bodily movement and vertical pivotal movement on the draft bar 20 and for this purpose are preferably provided with a plurality of rollers 55, 55 spaced on opposite sides of said bar with their bearing faces curved to conform substantially with the surface of said bar. In the preferred form said bar is circular in cross section so as to permit the gangs to be swung pivotally on the supporting rod in a vertical plane by means which will hereinafter be more fully described.

Means are provided for moving the gang heads 21, 21 toward and away from each other, which means herein consists of a pair of links 60, 60 pivotally connected in holes 61, 61 on the forward ends of said supports and extending to opposite ends of lever arms 62, 62 on a longitudinally disposed rocking shaft 63 (see Figures 9 and 10). As herein shown this rocking shaft extends rearwardly between the draft bar 20 and the yoke 25 and thence below the cross bar 40 and is journalled adjacent its rear end in the flanged portion 65 of a supporting member 66. This supporting member extends upwardly and forwardly over the cross arm 40 and also has an upwardly extending flange 67 at its forward end immediately adjacent the yoke 25. The rocking shaft 63 is actuated by suitable means such as a handle 68 and by reason of the connection of the links 60 on opposite sides of the axis thereof as shown, this rocking movement affords adjustment of the gang heads 21, 21 on the bar 20 toward and away from each other.

The supporting member 66 just described is capable of being secured in two positions, depending upon whether it is desired to shift both of the gang heads laterally as the wheels are steered, or to fix the gang heads centrally of the frame but still being adjustable with respect to each other. Accordingly, this member may be fixed to the laterally moving cross bar 40 by suitable means such as bolts 70, 70 as shown in Figure 1, thus connecting the gang heads so as to be shifted bodily in either direction as the wheels are steered. In the second position suggested, said bolts are withdrawn and are placed in position indicated 71, 71 where they extend through the flange 67 of said member to secure the latter to the yoke 25 which is rigid with the main frame, thus securing the rocking member in a position centrally of the frame and arranged so that when the rocking shaft is manipulated the gangs will be shifted toward and away from each other, but at all times in positions concentric with the longitudinal axis of the frame.

Figure 2:
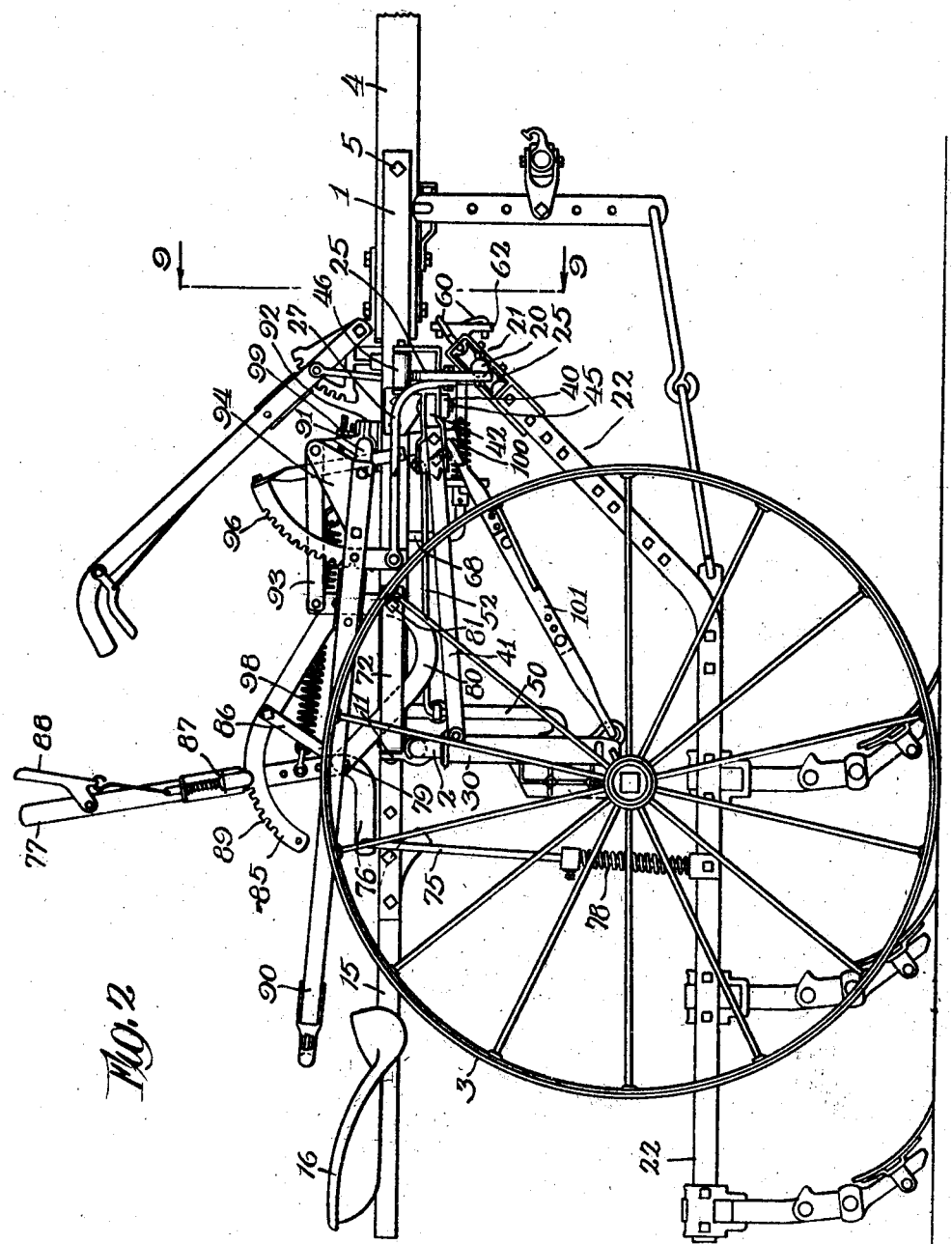
Figure 2 is a side view of cultivator shown in Figure 1.

Means are provided for controlling the relation of the gangs to the ground which herein consists of a pair of links 75, 75 each connected adjacent the rear ends of a gang 22 and extending upwardly into engagement with a lever arm 76 extending forwardly and rigid with an upwardly extending hand lever 77. It will be seen that two such hand levers are provided, one for each set of gangs and having as their principle object to control the depth of their respective gangs. In the form shown, each of the connecting links 75, 75 are provided with compression springs 78 of the usual construction, tending to depress the gangs in the ground when the links are actuated by the depth levers 77. Each of the hand levers 77 are pivoted at 79 on the rear end of a downwardly arched member 80 substantially U-shaped in form and pivoted at 81 near the forward end thereof to the main frame. In the form shown each of the U-shaped levers has its lower portion guided between a main frame portion 12 and a parallel guide member 72 secured in spaced relation from the latter, thereby guiding and supporting said lever member in all permissible positions thereof. This arrangement permits the use of relatively light structural material for the lever parts and their pivotal connection with the frame. Segment members 85, 85 for the hand levers are connected with their respective U-shaped members 80 adjacent their forward ends and to the rear ends thereof by a link 86, the arrangement being such that a spring pressed dog 87 operated by a hand latch 88 of the usual construction may be engaged in any one of a series of notches 89, 89 on said segment member in any permissible position of said U-shaped members. Thus in Figure 2 the levers just described are shown in position with the gangs substantially parallel with the ground. When it is desired to depress either one of the gangs so as to control the depth thereof, either one of the hand levers 77 may be moved rearwardly, and the spring pressed dog 87 adjusted in the proper notch on the segment member 85. Means are also provided for affording bodily pivotal movement of the gangs in a vertical direction, which means comprises a master lever 90 connected to a transverse rocking shaft 91 extending across the front part of the structure and having bearing in suitable brackets 92, 92 secured to the main frame 1 as shown. This rocking shaft is operatively connected to the forward ends of U-shaped lever members 80, 80 by means of links 93, 93 connected to upwardly extending lever arms 94, and 95 carried on opposite ends of the rocking shaft 91 as shown in Figure 2. Lever arm 94 is connected for convenience to the master lever 90 while the opposite lever arm 95 is of the same effective length but is connected directly to the end of the rocking shaft 91. The master lever 90 is provided with a hand pressed latch of the usual form operable on a segment 96 fixed on the main frame as shown. By means of the master lever just described it will be observed that the entire lever mechanism including hand levers 77, 77 may be swung upwardly to raise the gangs as shown in Figure 3, the forward ends of the gangs being provided with roller bearings 55, 55 affording vertical pivotal movement thereof on the drag bar 20 as herein before described. In order to assist in the lifting movement of the lever mechanism a pair of springs 98, 98 are connected between each of the hand levers 77, 77 and a fixed portion of the frame; as herein shown the forward ends of the springs are connected respectively with a pair of brackets 99, 99 integral with the bearings 92, 92 of the rocking shaft 91.

Means are provided in connection with the gang lifting mechanism for balancing the frame of the cultivator with respect to the wheels when the cultivator gangs are in elevated position as shown in Figure 3. This means comprises a pair of downwardly extending arms 100, 100 carried rigid with the ends of the rocking shaft 91 associated with the master lever 90. These levers are connected to links 101, 101 extending downwardly and pivotally secured adjacent the lower ends of the swivel axle brackets 30, 30 on either side of the frame. The bail axles 2, 2 are pivotally secured in their brackets 11, 11 to swing on a transverse axis, so that when the master lever 90 is in raised position as shown in Figure 3 the main frame is swung forwardly respective to the wheels, or in other words, the bail axles are swung rearwardly so that the center of gravity of the main frame is shifted forwardly with respect to the axis of the wheels.

While I have illustrated and described one particular embodiment of my invention, it will be understood that I do not wish to be limited to the exact construction shown and described, but that various changes and modifications may be made without departing from the spirit and scope of my invention.

I claim:

1. In a cultivator, the combination of a main frame having a transversely extending draft bar at the forward end thereof, a cultivator beam supported for transverse movement on said draft bar, supporting wheels having axles mounted for pivotal movement on vertical axes, means connecting said wheel axles for simultaneous pivotal movement thereof including a transversely movable connecting bar, a yoke affording support for the opposite ends of said connecting bar independently of said draft bar and means for connecting said beam with said draft bar for shifting the latter bodily therewith during the transverse movement of said bar.

2. In a cultivator, the combination of a main frame having a transversely extending draft bar thereon, a pair of gang heads mounted for transverse movement on said draft bar, supporting wheels having axles mounted for pivotal movement on horizontal and vertical axes, a transversely disposed bar supported on said frame for endwise movement and connectible with said gang heads for moving the same, and means connecting said wheel axles with said bar including links pivoted on transverse axes.

3. In a cultivator, the combination of a main frame, having a transversely extending draft bar at the forward end of said frame, a pair of gang heads mounted for transverse movement on said draft bar, supporting wheels mounted for pivotal movement on vertical axes, means connecting said wheels for simultaneous pivotal movement thereof including a transversely movable bar, means for shifting said gang heads toward and away from each other on said draft bar and means selectively affording operative connection between said last named means and said transversely movable bar for shifting said gangs bodily in either direction when said wheels are turned to steer the device, or for connecting said last named means rigidly to the main frame.

4. In a cultivator, the combination of a main frame having a transversely extending draft bar at the forward end of said frame, a pair of gang heads mounted for transverse movement on said draft bar, supporting wheels mounted for pivotal movement on vertical and horizontal axes, means connecting said wheels for simultaneous pivotal movement thereof including a transversely movable bar supported on said frame and a pair of links pivoted on transverse axes, means for shifting said gang heads toward and away from each other on said draft bar and means selectively affording operative connection between said last named means and said transversely movable bar for shifting said gangs bodily in either direction when said wheels are turned to steer the device, or for connecting said last named means rigidly to the main frame.

5. In a cultivator, the combination of a main frame, a transversely extending draft bar at the forward end thereof, a pair of gang heads mounted for transverse movement on said draft bar, a pair of supporting wheels on said cultivator having axles mounted for steering movement on vertical axes, a transversely movable cross bar adjacent said draft bar and linked at opposite ends to said wheel axles whereby said axles are shifted simultaneously in either direction and means affording selective connection between said gang heads and said cross bar for shifting the latter bodily in the same direction the vehicle is steered, or for maintaining the same rigidly with respect to the main frame.

6. In a cultivator, the combination of a main frame, a transversely extending draft bar at the forward end thereof, a pair of gang heads mounted for transverse movement on said draft bar, a pair of supporting wheels on said cultivator having axles mounted for steering movement on vertical and horizontal axes, a transversely movable bar supported on said frame adjacent said draft bar and connected at opposite ends to said wheel axles by links pivoted on transverse axes, and means connecting said transverse bar with said gang heads.

7. In a cultivator, the combination of a main frame, a transversely extending draft bar at the forward end thereof, a pair of gang heads mounted for transverse movement on said draft bar a pair of supporting wheels having axles mounted for steering movement on vertical axes, a transversely movable bar adjacent said draft bar and linked at opposite ends to said wheel axles whereby said axles are shifted simultaneously in either direction and means for shifting said gang heads toward and away from each other comprising a pair of links connected to levers extending on opposite sides of a rocking shaft and a bearing for said rocking shaft mounted on said transversely movable bar.

8. In a cultivator, the combination of a main frame, a transversely extending draft bar on the forward end thereof a pair of gang heads mounted for transverse movement on said draft bar, a pair of supporting wheels on said cultivator having axles mounted for steering movement on vertical axes, a transversely movable bar adjacent said draft bar and linked at opposite ends to said wheel axles whereby said axles are shifted simultaneously in either direction, and means for shifting said gang heads toward and away from each other comprising a pair of links connected to levers extending on opposite sides of a rocking shaft, a bearing for said rocking shaft, and means for selectively connecting said bearing with said transversely movable bar or with said main frame.

Signed at Rock Island, Ill., this 14th day of June, 1924.

LEE H. KAUPKE.